US012035458B2

(12) United States Patent
Yamauchi et al.

(10) Patent No.: US 12,035,458 B2
(45) Date of Patent: Jul. 9, 2024

(54) QUADRUPOLE ACCELERATOR AND A METHOD FOR MANUFACTURING QUADRUPOLE ACCELERATOR

(71) Applicant: Time Co., Ltd., Mihara (JP)

(72) Inventors: Hideaki Yamauchi, Hiroshima (JP); Masashi Masuoka, Hiroshima (JP)

(73) Assignee: Time Co., Ltd., Mihara (JP)

( * ) Notice: Subject to any disclaimer, the term of this patent is extended or adjusted under 35 U.S.C. 154(b) by 174 days.

(21) Appl. No.: 17/934,975

(22) Filed: Sep. 23, 2022

(65) Prior Publication Data

US 2023/0112350 A1 Apr. 13, 2023

(30) Foreign Application Priority Data

Oct. 7, 2021 (JP) ................................ 2021-165816

(51) Int. Cl.

*H05H 7/00* (2006.01)
*H05H 7/04* (2006.01)
*H05H 9/04* (2006.01)

(52) U.S. Cl.

CPC .............. *H05H 7/04* (2013.01); *H05H 9/045* (2013.01); *H05H 2007/043* (2013.01)

(58) Field of Classification Search

CPC ..... H05H 9/045; H05H 7/04; H05H 2007/043
See application file for complete search history.

(56) References Cited

U.S. PATENT DOCUMENTS

| | | | | |
|---|---|---|---|---|
| 4,949,047 A * | 8/1990 | Hayward | H05H 9/045 | 335/298 |
| 5,315,120 A * | 5/1994 | Potter | H05H 7/02 | 250/396 R |
| 8,928,216 B2 * | 1/2015 | Hayashizaki | H05H 9/045 | 313/359.1 |

FOREIGN PATENT DOCUMENTS

| | | | |
|---|---|---|---|
| EP | 2490512 | A1 | 8/2012 |
| JP | S6353898 | A | 3/1988 |
| JP | 2011086494 | A | 4/2011 |
| JP | 2011086498 | A | 4/2011 |
| JP | 5317062 | B2 | 10/2013 |
| JP | 5317063 | B2 | 10/2013 |

OTHER PUBLICATIONS

Pan Gang et al. "Tuning of a One-Meter Four-vane RFQ," Nuclear Physics Review, Jun. 2014, pp. 161-165, DOI: 10.11804/NuclPhysRev.31.02.161.

(Continued)

*Primary Examiner* — Tuan T Lam

(57) ABSTRACT

A quadrupole accelerator includes a center member, a first side member, and a second side member. The center member includes a center outer frame part, a first electrode and a second electrode. The first side member includes a first side outer frame part, a first wall part and a third electrode. The second side member includes a second side outer frame part which extends from the second side outer frame part toward an outside, a second wall part and a fourth electrode. The center member is formed seamlessly. The first side member is formed seamlessly. The second side member is formed seamlessly. The first side outer frame is fixed to a first side of the center outer frame part by a first fixing member. The second side outer frame is fixed to a second side of the center outer frame part by a second fixing member.

3 Claims, 10 Drawing Sheets

(56) References Cited

OTHER PUBLICATIONS

Chenxing Li et al., "RF structure design of the China Material Irradiation Facility RFQ," Nuclear Inst. and Methods in Physics Research, A, Jul. 2017, pp. 38-45.
European Search Report dated Mar. 6, 2023 for Application No. 22199324.9.

* cited by examiner

Before Tuning

After 1st Tuning

After 2nd Tuning

After 3rd Tuning

Conventional Tuner Type

Conventional Tuner Type

QUADRUPOLE ACCELERATOR AND A METHOD FOR MANUFACTURING QUADRUPOLE ACCELERATOR

CROSS REFERENCE TO RELATED APPLICATIONS

This application claims priority from Japanese Patent Application No. 2021-165816 filed Oct. 7, 2021. The entire content of the priority application is incorporated herein by reference.

TECHNICAL FIELD

This disclosure relates to a quadrupole accelerator.

BACKGROUND

A quadrupole accelerator is conventionally known which includes four electrodes. The four electrodes form two mutually facing pairs. At the tip of each of electrodes, the end of the waveform suitable for acceleration of the beam is formed in the direction of the acceleration beam axis. In the space surrounded by the four electrodes, an electric field is formed for accelerating and focusing a beam. By injecting charged particles into this space, the charged particles are accelerated.

SUMMARY

According to one aspect, this specification discloses a quadrupole accelerator. The quadrupole accelerator includes a center member, a first side member which is fixed to the center member, and a second side member which is fixed to the center member. The center member includes a center outer frame part, a first electrode which sticks out from the center outer frame part toward an inside, and a second electrode which sticks out from the center outer frame part toward the inside. The first side member includes a first side outer frame part, a first wall part which extends from the first side outer frame part toward an outside, and a third electrode which sticks out from the first wall part toward the inside. The second side member includes a second side outer frame part, a second wall part which extends from the second side outer frame part toward an outside, and a fourth electrode which sticks out from the second wall part toward the inside. The center member is formed seamlessly. The first side member is formed seamlessly. The second side member is formed seamlessly. The first side outer frame is fixed to a first side of the center outer frame part by a first fixing member. The second side outer frame is fixed to a second side of the center outer frame part by a second fixing member. A first hollow circular cylinder is formed in a first space. The first space is surrounded by the first wall part, the first electrode, and the third electrode. The first hollow circular is long in a direction of an acceleration beam axis. A second hollow circular cylinder is formed in a second space. The second space is surrounded by the first wall part, the third electrode, and the second electrode. The second hollow circular cylinder being long in the direction. The third hollow circular cylinder is formed in a third space. The third space is surrounded by the second wall part, the second electrode, and the fourth electrode. The third hollow circular cylinder is long in the direction. A fourth hollow circular cylinder is formed in a fourth space. The fourth space is surrounded by the second wall part, the fourth electrode, and the first electrode. The fourth hollow circular cylinder is long in the direction. A first cutting surface is provided on a first inner surface of the first wall part. The first inner surface is a portion forming a part of the first follow cylinder. A second cutting surface is provided on a second inner surface of the first wall part. The second inner surface is a portion forming a part of the second follow cylinder. A third cutting surface is provided on a third inner surface of the second wall part. The third inner surface is a portion forming a part of the third follow cylinder. A fourth cutting surface is provided on a fourth inner surface of the second wall part. The fourth inner surface is a portion forming a part of the fourth follow cylinder. resonance frequency before cutting the first cutting surface, the second cutting surface, the third cutting surface, and the fourth cutting surface is higher than a frequency of high frequency power supplied from a power supply.

BRIEF DESCRIPTION OF THE DRAWINGS

Embodiments in accordance with this disclosure will be described in detail with reference to the following figures wherein.

DETAILED DESCRIPTION

A conventional quadrupole accelerator includes a first electrode, a second electrode, a third electrode and fourth electrode. The four electrodes are seamlessly formed with a member which forms a tubular part. Each of the four electrodes is formed so that the apex of the triangular shape of the cross-sectional shape extends to the acceleration beam axis of the charged particles. At the tip of each of the electrodes extending to the acceleration beam axis, the end of the waveform is formed so as to form an electric field which accelerates and focuses charged particles in the direction of the acceleration beam axis.

To accelerate charged particles to have desired energy in the high-frequency accelerator, the resonance frequency in the high-frequency accelerator is required to approach the frequency of radio frequency power (hereinafter, also simply called "supply frequency") supplied to the high-frequency accelerator.

Accordingly, in the conventional high-frequency accelerator, an operator performs tuning which causes the resonance frequency to approach the supply frequency using a dedicated tuner. Specifically, in an initial state after assembly, the resonance frequency in the high-frequency accelerator is set to be lower than the supply frequency. The tuner attached after assembly is operated, and the resonance frequency is gradually increased. Accordingly, the resonance frequency in the high-frequency accelerator approaches the supply frequency.

Figure 13:
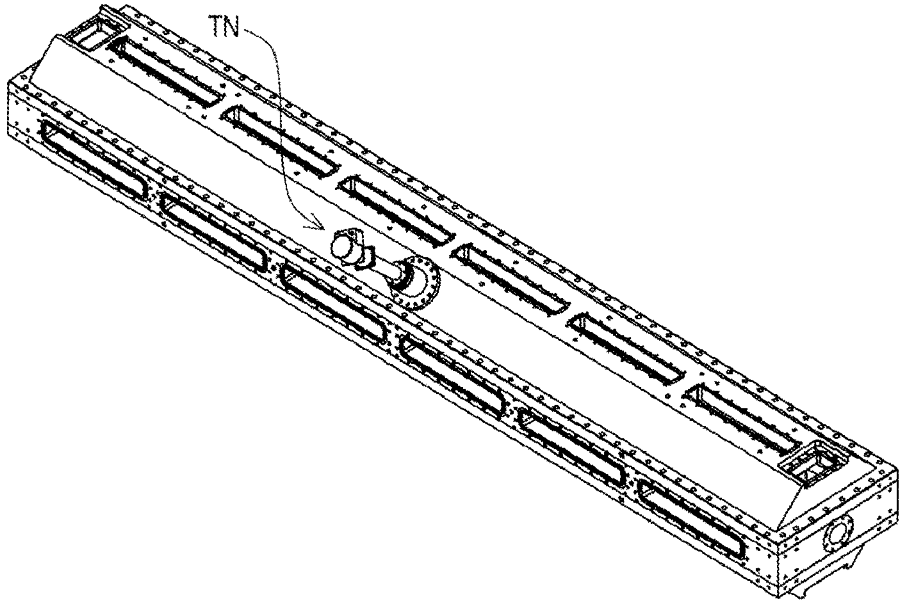
FIG. 13 is a schematic perspective view of a conventional quadrupole accelerator having a tuner.

Specifically, as shown in FIG. 13, a tuner TN is attached through a tuner port (not shown) formed in a side surface of the conventional high-frequency accelerator.

Figure 14:
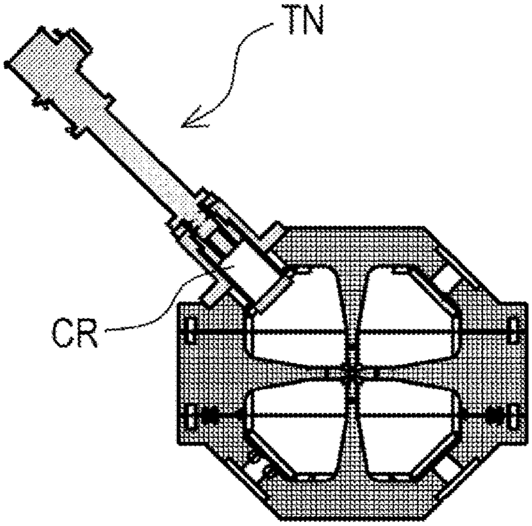
FIG. 14 is a sectional view showing a state in which a conventional quadrupole accelerator is vertically cut.

As shown in FIG. 14, the tuner TN is provided with a circular cylindrical part CR which is made of copper and is insertable into and removable from the internal space of the high-frequency accelerator. When the circular cylindrical part CR sticks out into the internal space of the high-frequency accelerator, the volume of the internal space decreases. When the volume of the internal space of the high-frequency accelerator decreases, the resonance frequency in the high-frequency accelerator becomes high. As a result, the resonance frequency in the high-frequency accelerator approaches the supply frequency.

However, adjustment (a conventional tuning method) of the resonance frequency in the high-frequency accelerator using the tuner TN shown in FIGS. 13 and 14 has problems as described below.

First, part of the circular cylindrical part CR of the tuner TN sticks out into the internal space of the high-frequency accelerator. Accordingly, the circular cylindrical part serves as electrical resistance. The higher the electrical resistance is, the higher the power consumption is. Accordingly, the quality factor (a value obtained by dividing the energy accumulated in the internal space of the accelerator in operation by the energy consumption) decreases. The higher the quality factor is, the longer the operating time per unit energy is, which indicates excellency in operation efficiency. Consequently, reduction in quality factor is unfavorable. Further, the higher the power consumption is, the higher the temperature in the high-frequency accelerator is. Accordingly, the volume in the high-frequency accelerator is changed by metal expansion.

When the circular cylindrical part CR of the tuner TN is inserted into and removed from the internal space of the high-frequency accelerator during operation of the high-frequency accelerator, multipacting occurs at high frequency. Occurrence of multipacting adversely affects the vacuum state, and rapidly changes the situations in the high-frequency accelerator, which in turn adversely affects the acceleration of charged particles.

Moreover, the circular cylindrical part CR of the tuner TN is made of metal. Accordingly, frequent insertion and removal of the circular cylindrical part CR causes a friction between an RF contact and the circular cylindrical part CR, and metal powder accumulates in the internal space of the high-frequency accelerator. The accumulation of metal powder in the internal space of the high-frequency accelerator obstructs the operation of the high-frequency accelerator due to discharge etc.

In view of the foregoing, an aspect of an objective of this disclosure is to provide a quadrupole accelerator that adjusts a resonance frequency in a high-frequency accelerator to a desired frequency without using a tuner.

Figure 1:
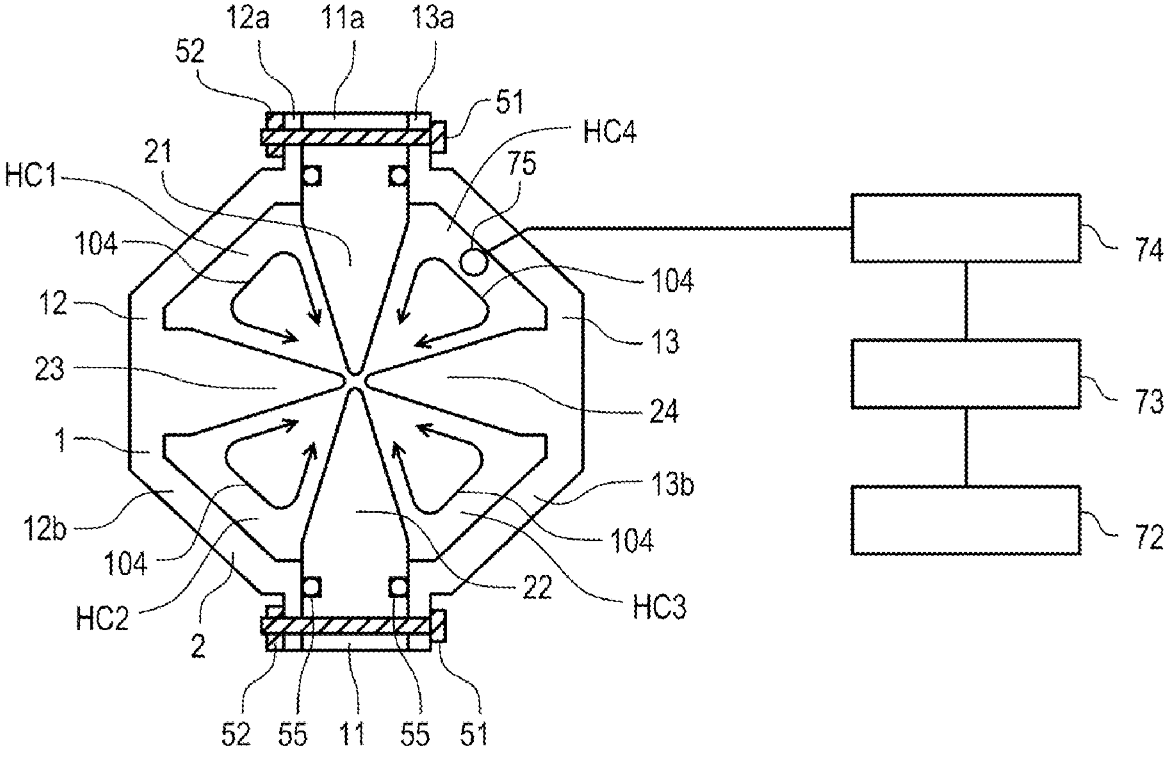
FIG. 1 is a schematic view of a quadrupole accelerator according to an embodiment.

As shown in FIG. 1, a quadrupole accelerator according to this embodiment includes an acceleration cavity 1. The acceleration cavity 1 includes a tubular part 2 which is formed in a tubular shape. The acceleration cavity 1 protrudes inward from the tubular part 2. The acceleration cavity 1 has electrodes 21, 22, 23, and 24 called "vanes". These electrodes 21, 22, 23, and 24 are electrically connected to the tubular part 2.

The quadrupole accelerator includes a first electrode 21, a second electrode 22, a third electrode 23 and a fourth electrode 24. The four electrodes 21 to 24 are seamlessly formed with the members which form the tubular part 2. These electrodes 21 to 24 are formed so as to extend along the acceleration beam axis of the charged particles.

Each of the electrodes 21 to 24 is formed into triangular prism shapes. Each of the electrodes 21 to 24 is formed so that the apex of the triangular shape of the cross-sectional shape extends to the acceleration beam axis of the charged particles. At the tip of each of the electrodes 21 to 24 extending to the acceleration beam axis, the end of the waveform is formed so as to form an electric field which accelerates and focuses charged particles in the direction of the acceleration beam axis. The shape of the each of the electrodes 21 to 24 is not limited to this. It is possible to adapt any shapes which stick out from the tubular part and the tip of the electrodes approach the acceleration beam axis. For example, the electrodes may also be formed in plate shapes.

The quadrupole accelerator includes a power supply device for supplying radio frequency power. The power supply device includes a radio frequency signal generator 72. The radio frequency signal generator 72 is connected to a preamplifier 73 and a main amplifier 74. The radio frequency power which is generated by the radio frequency signal generator 72 is amplified by the preamplifier 73 and main amplifier 74. The radio frequency power which is output from the main amplifier 74 is supplied through a coupler 75 to an acceleration cavity 1. The power supply device is not limited to this. It is possible to adapt any devices which supply the acceleration cavity 1 with radio frequency power.

The acceleration cavity 1 has a floating capacitance and floating inductance dependent on the shapes of the tubular part 2 and each of the electrodes 21 to 24. These floating capacitance and floating inductance form part of an electrical circuit. By supplying radio frequency power to the acceleration cavity, an accelerating electric field is excited. When exciting an electromagnetic field of the TE210 mode or TE211 mode suitable for the quadrupole accelerator, the potentials of the first electrode 21, the second electrode 22, the third electrode 23, and the fourth electrode 24 become the same. Further, the electrode pair of the mutually facing the first electrode 21 and the second electrode 22 and the electrode pair of the mutually facing the third electrode 23 and the fourth electrode 24 become opposite polarities (plus or minus). The acceleration beam axis is arranged in the space between the four electrodes 21 to 24. The charged particles move while being accelerated along the acceleration beam axis.

Figure 2:
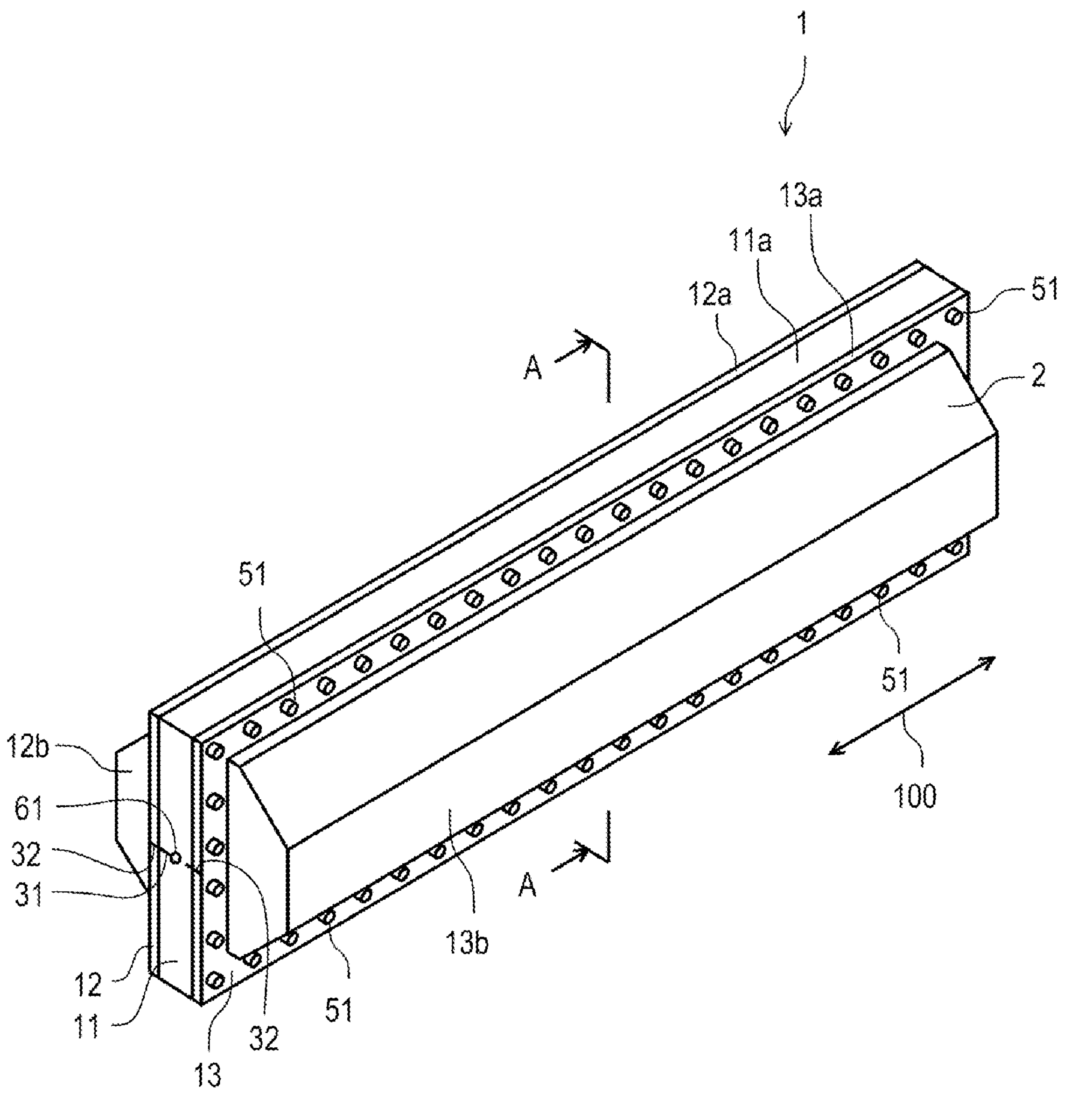
FIG. 2 is a schematic perspective view of a quadrupole accelerator.
Figure 3:
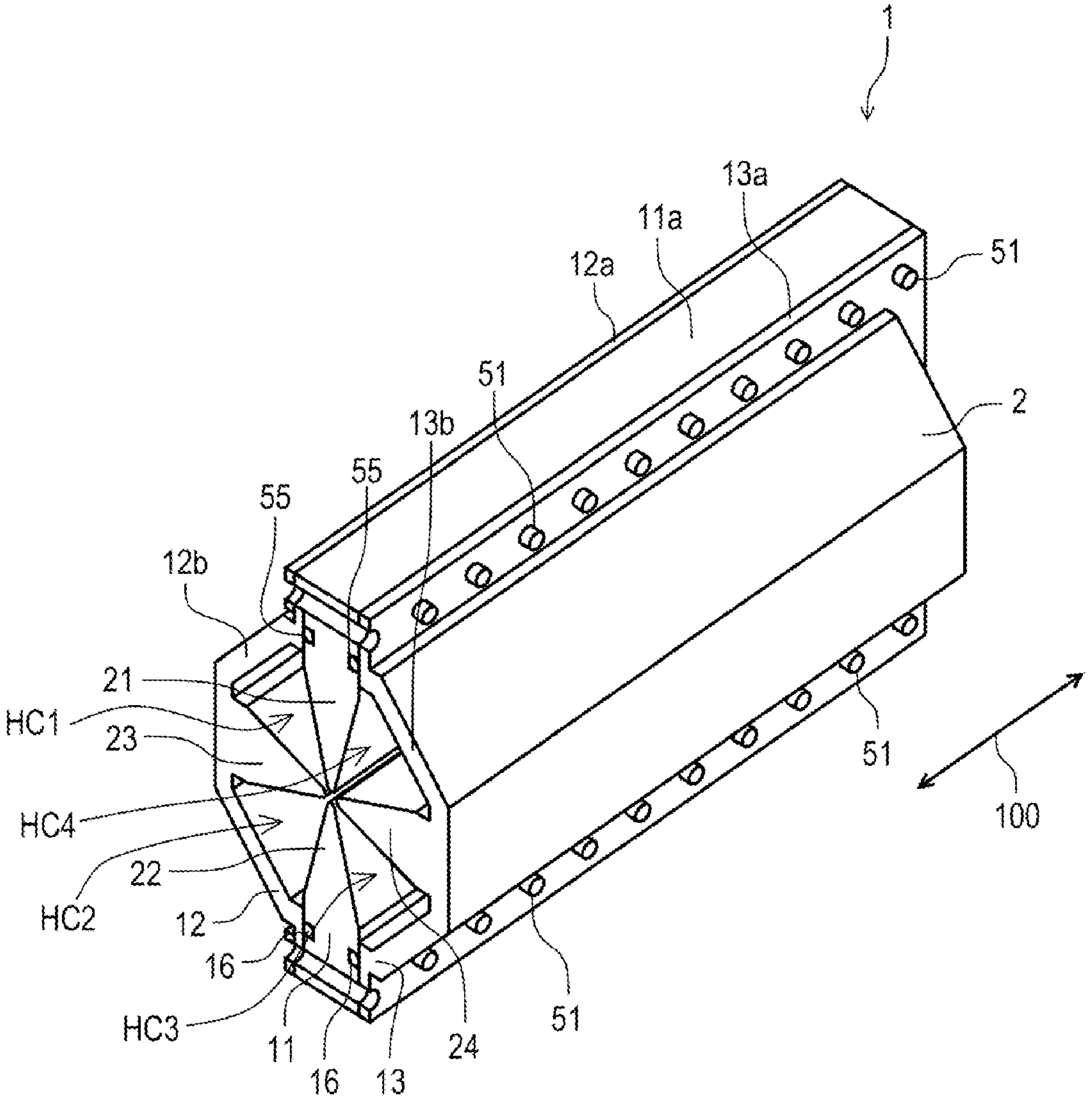
FIG. 3 is a schematic perspective view showing a state in which a quadrupole accelerator is vertically cut in a direction of an acceleration beam axis.

FIG. 2 is a schematic perspective view of an acceleration cavity. FIG. 3 is a schematic perspective view when cutting the acceleration cavity in the present embodiment. FIG. 3 is a perspective view of the time when cutting the acceleration cavity along the line A-A in FIG. 2. The arrow mark 100 shown in FIGS. 2 and 3 indicate the direction of extension of the acceleration beam axis of the charged particles. The acceleration cavity 1 is formed so as to extend in parallel with the direction of the acceleration beam axis.

Referring to FIG. 1 to FIG. 3, the acceleration cavity 1 includes three component members. The acceleration cavity 1 has a center member 11 which includes the first electrode 21 and the second electrode 22. The acceleration cavity 1 has a first side member 12 which includes a third electrode 23. The acceleration cavity 1 has a second side member 13 which includes a fourth electrode 24. The first side member 12 is arranged at one side of the center member 11. The second side member 13 is arranged at the other side of the center member 11.

The center member 11 is seamlessly formed from single members. That is, the center member 11 is formed from single materials without partitioning lines, weld lines, etc. of a plurality of parts. The first side member 12 is seamlessly formed from single members. That is, the first side member 12 is formed from single materials without partitioning lines, weld lines, etc. of a plurality of parts. The second side member 13 is seamlessly formed from single members. That is, the second side member 13 is formed from single materials without partitioning lines, weld lines, etc. of a plurality of parts. Note that, a vacuum port or other additional members may also be arranged in advance at the center member or side member.

The center member 11, first side member 12, and second side member 13 are fastened to each other by fastening members. In the present embodiment, a bolt 51 and a nut 52 are used as the fixing members.

At the contact surfaces between the center member 11 and the first side member 12, and the contact surfaces between the center member 11 and the second side member 13, O-rings 55 are arranged as vacuum sealing members. By these vacuum sealing members being arranged between the component members, the acceleration cavity 1 is sealed.

Figure 4:
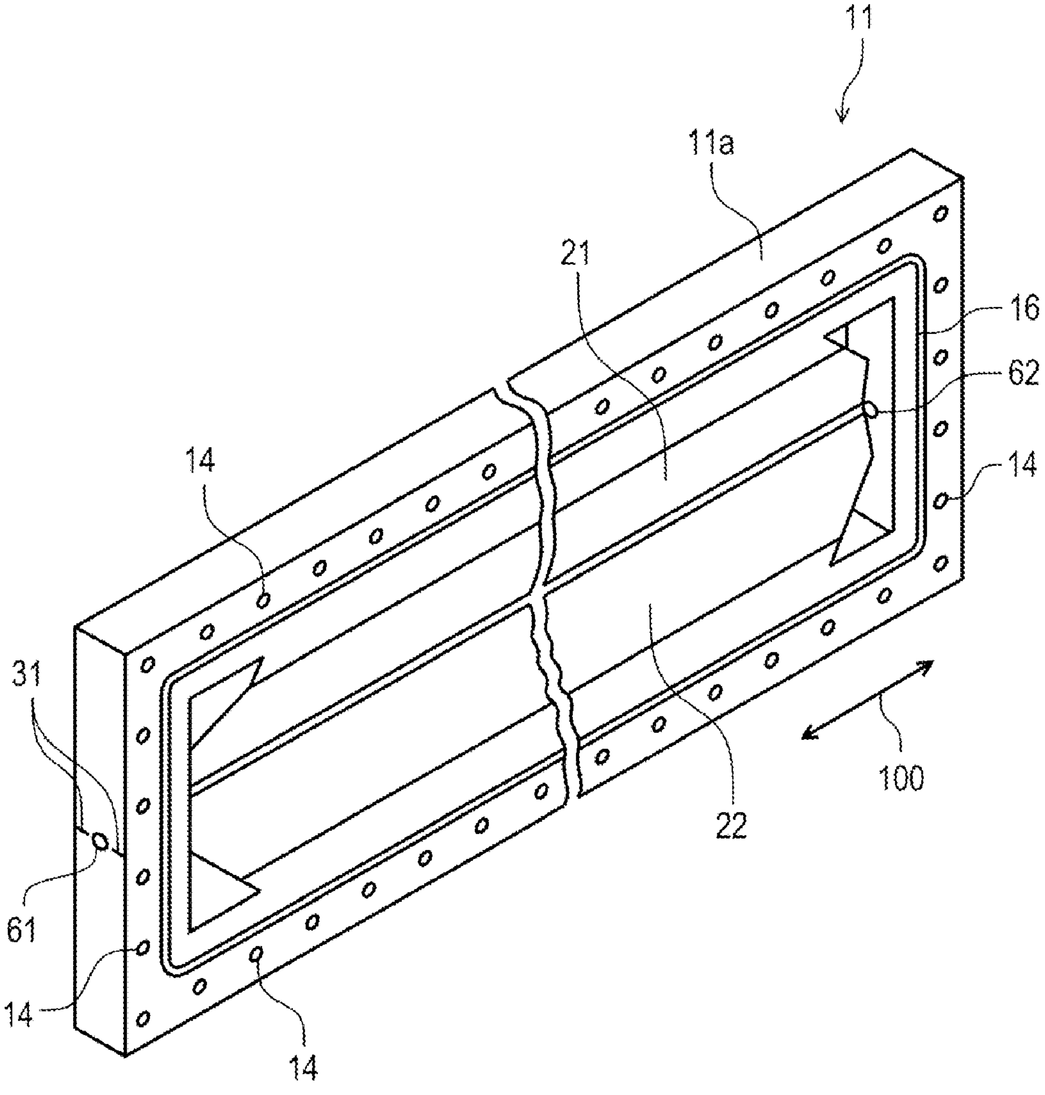
FIG. 4 is a schematic perspective view showing a center member that forms part of a quadrupole accelerator.

FIG. 4 is a schematic perspective view of the center member in the present embodiment. The center member 11 has a center outer frame part 11*a* which forms the center part of the outer frame part of the acceleration cavity 1. The center outer frame part 11*a* is formed in a window shape when viewed by a plan view. The center member 11 includes a first electrode 21 which sticks out from the center outer frame part 11*a* toward the inside. The center member 11 includes a second electrode 22 which sticks out from the center outer frame part 11*a* toward the inside. The first electrode 21 and the second electrode 22 are arranged so that their respective tips extend to the acceleration beam axis.

In the surface at the outside of the center member 11, the one end face in the direction of the acceleration beam axis is formed with a beam injection port 61 into which the charged particles enter. Further, the other end face in the direction of the acceleration beam axis is formed with a beam extraction port 62 from which the charged particles are extracted. The other end face is an end face at the opposite side to the one end face where the beam injection port 61. The beam injection port 61 and the beam extraction port 62 are formed on an extension of the acceleration beam axis.

The center outer frame part 11*a* is formed with through holes 14 for passing bolts. Pluralities of through holes 14 are formed along the shape of the center outer frame part 11*a*. In the surface of the center outer frame part 11*a*, the contact surface which contacts the first side member 12 or second side member 13 is formed with a grooved part 16 for placement of an O-ring 55. The grooved part 16 is formed in a closed shape when viewed by a plan view. A grooved part for placement of an O-ring or other vacuum sealing member may also be arranged at the first side member 12 and second side member 13.

The center member 11 is formed with reference marks 31 for determining the positions of the members with each other in the assembly step of assembling the members. The end face where the beam injection port 61 is formed is formed with a reference mark 31. Further, the end face where the beam extraction port 62 is formed is formed with a reference mark 31. The reference marks 31 are formed in straight shapes.

Figure 5:
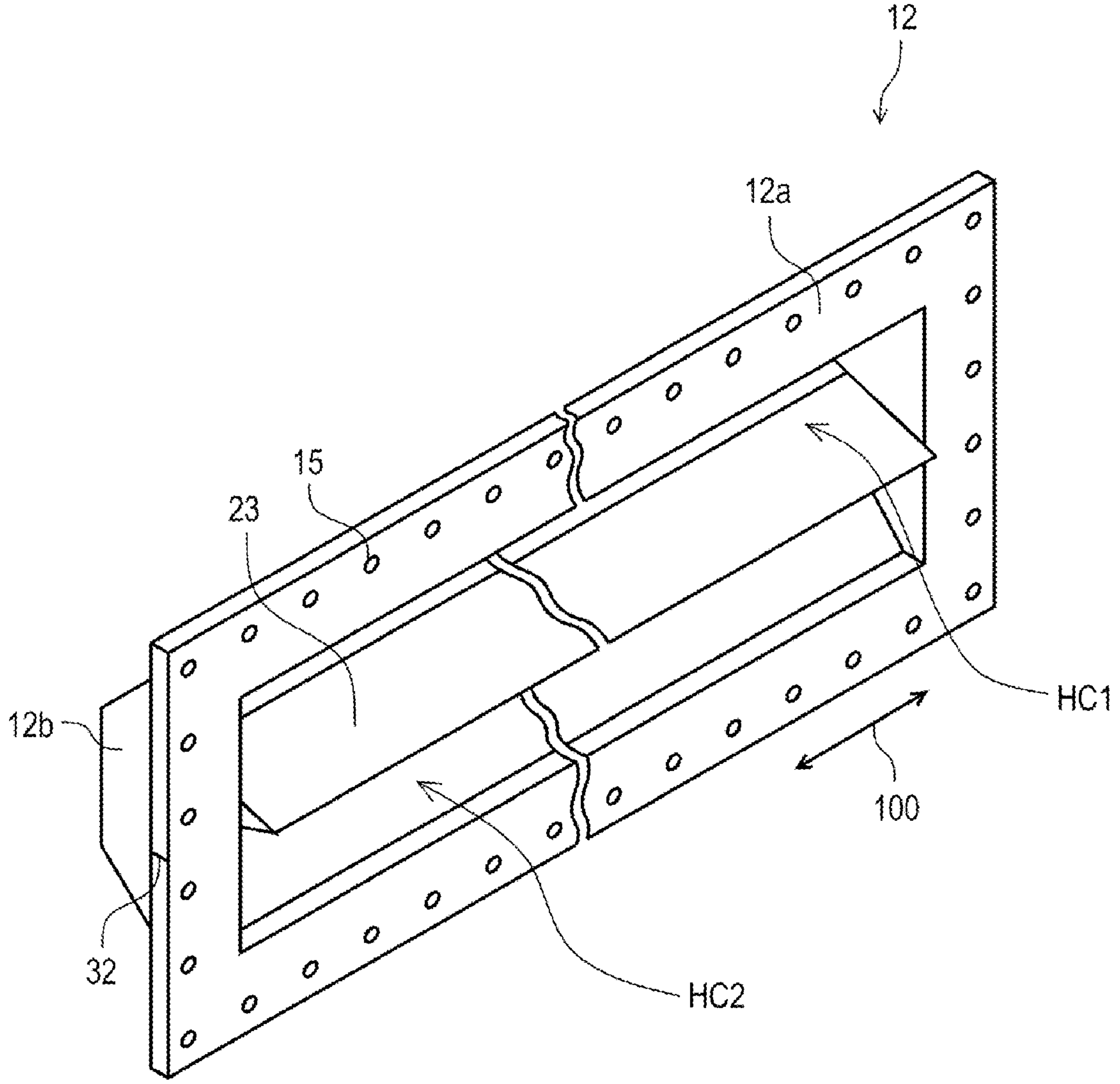
FIG. 5 is a schematic perspective view showing a first side member that forms part of a quadrupole accelerator.

As shown FIG. 5, the first side member 12 has a first side outer frame part 12*a* which forms a side part of the outer frame part of the acceleration cavity 1. The first side outer frame part 12*a* is formed into a window shape when viewed by a plan view. The first side member 12 has a first wall part 12*b* which has the shape of part of the acceleration cavity. The first wall part 12*b* forms the tubular part 2 of the acceleration cavity 1. The first wall part 12*b* is formed so that the first side outer frame part 12*a* extends toward the outside. The first wall part 12*b* is formed into a plate shape and is joined with the first side outer frame part 12*a*. The first side member 12 includes a third electrode 23 which sticks out from the first wall part 12*b* toward the inside.

The first side outer frame part 12*a* is formed with through holes 15 for passing bolts. The first side outer frame part 12*a* is formed with positioning marks 32 for determining the assembly position in the assembly step. At the end faces of the first side outer frame part 12*a*, the positioning marks 32 are formed at the end faces at the both sides in the direction of the acceleration beam axis.

In FIG. 5, the first side member 12 among the two side members is taken up as an example for the explanation, but the second side member 13 has a similar configuration to the first side member 12. The second side member 13 includes a window-shaped second side outer frame part 13*a*. The second side member 13 includes a second wall part 13*b* which extends from the second side outer frame part 13*a* toward the outside and has the shape of part of the acceleration cavity. The second side member 13 includes a fourth electrode 24 which sticks out from the second wall part 13*b* toward the inside.

As shown in FIG. 1, a first hollow circular cylinder HC1 (an example of a first hollow circular cylinder according to the present invention) having a cylindrical shape longitudinal in the acceleration beam axis of the charged particles is formed in a space surrounded by the first wall part 12*b*, the first electrode 21 and the third electrode 23.

Further, a second hollow circular cylinder HC2 (an example of a second hollow circular cylinder according to the present invention) having a cylindrical shape longitudinal in the acceleration beam axis of the charged particles is formed in a space surrounded by the first wall part 12*b*, the third electrode 23 and the second electrode 22.

Further, a third hollow circular cylinder HC3 (an example of a third hollow circular cylinder according to the present invention) having a cylindrical shape longitudinal in the acceleration beam axis of the charged particles is formed in a space surrounded by the second wall part 13*b*, the second electrode 22 and the fourth electrode 24.

Moreover, a fourth hollow circular cylinder HC4 (an example of a fourth hollow circular cylinder according to the present invention) having a cylindrical shape longitudinal in the acceleration beam axis of the charged particles is formed in a space surrounded by the second wall part 13*b*, the fourth electrode 24 and the first electrode 21.

Figure 6:
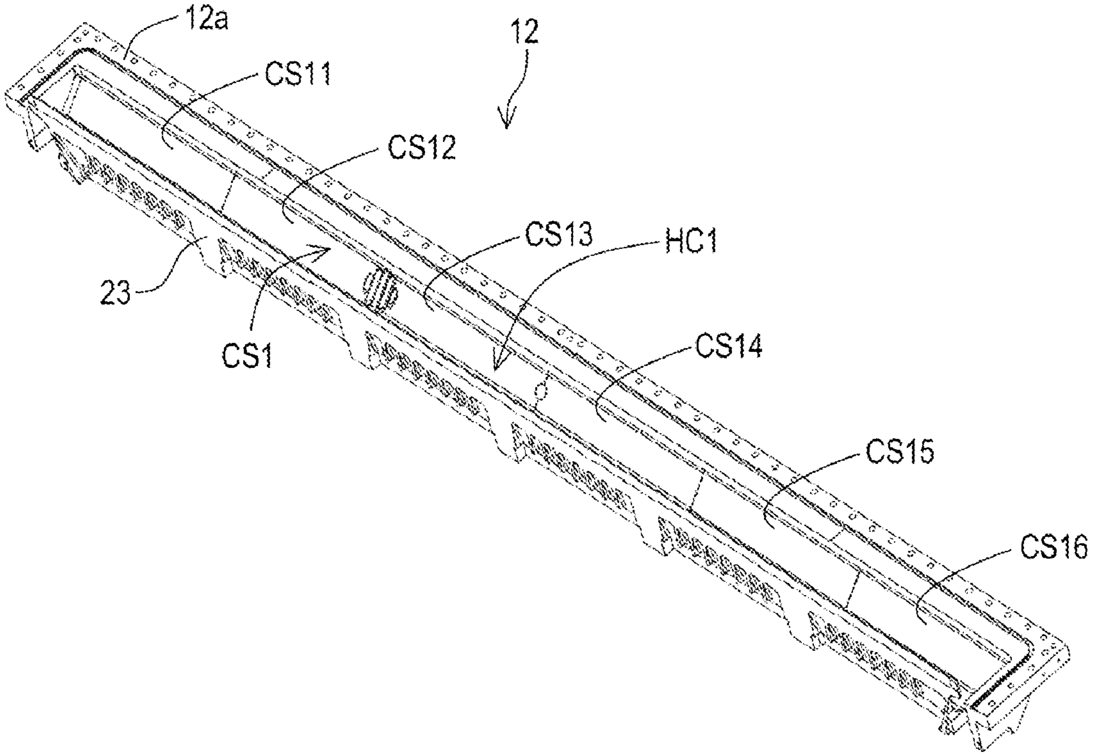
FIG. 6 is a schematic view showing six cutting surfaces provided inside a first side wall that forms part of a first side member.
Figure 7:
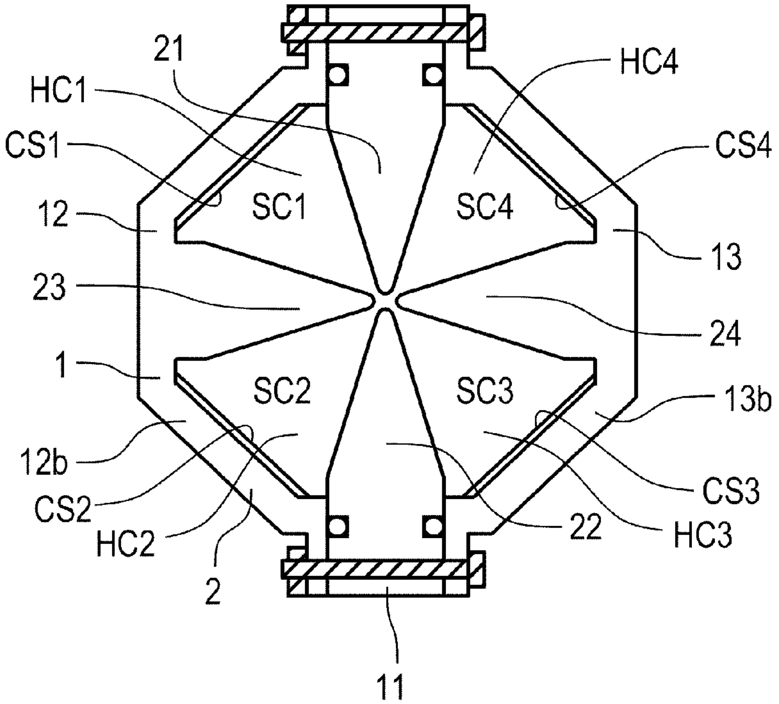
FIG. 7 is an enlarged sectional view showing a state in which a quadrupole accelerator is vertically cut in a direction of an acceleration beam axis.

As shown in FIGS. 6 and 7, a cutting surface CS1 (an example of a first cutting surface according to the present invention) is provided on an inner surface of the first wall part 12*b* which forms part of the first hollow circular cylinder HC1. The cutting surface CS1 is divided into six sections (cutting surfaces CS11, CS12, CS13, CS14, CS15 and CS16) with respect to the direction of the acceleration beam axis of the charged particles.

As shown in FIG. 7, a cutting surface CS2 (an example of a second cutting surface according to the present invention) is provided on an inner surface of the first wall part 12*b* which forms part of the second hollow circular cylinder HC2. The cutting surface CS2 is divided into six sections (cutting surfaces CS21, CS22, CS23, CS24, CS25 and CS26, not shown) with respect to the direction of the acceleration beam axis of the charged particles.

Likewise, a cutting surface CS3 (an example of a third cutting surface according to the present invention) is provided on an inner surface of the second wall part 13*b* which forms part of the third hollow circular cylinder HC3. The cutting surface CS3 is divided into six sections (cutting surfaces CS31, CS32, CS33, CS34, CS35 and CS36, not shown) with respect to the direction of the acceleration beam axis of the charged particles.

Likewise, a cutting surface CS4 (an example of a fourth cutting surface according to the present invention) is provided on an inner surface of the second wall part 13*b* which forms part of the fourth hollow circular cylinder HC4. The cutting surface CS4 is divided into six sections (cutting surfaces CS41, CS42, CS43, CS44, CS45 and CS46, not shown) with respect to the direction of the acceleration beam axis of the charged particles.

That is, 24 cutting surfaces in total are provided on the inner surfaces of the first wall part 12*b* and the second wall part 13*b*.

As shown in FIG. 7, since the cutting surface CS1 is present, the sectional area of a first cross-section SC1 of the first hollow circular cylinder HC1 which is taken perpendicularly to the direction of the acceleration beam axis of the charged particles is smaller than a possible sectional area in a case without the cutting surface CS1.

Since the cutting surface CS2 is present, the sectional area of a second cross-section SC2 of the second hollow circular cylinder HC2 which is taken perpendicularly to the direction of the acceleration beam axis of the charged particles is smaller than a possible sectional area in a case without the cutting surface CS2.

Since the cutting surface CS3 is present, the sectional area of a third cross-section SC3 of the third hollow circular cylinder HC3 which is taken perpendicularly to the direction of the acceleration beam axis of the charged particles is smaller than a possible sectional area in a case without the cutting surface CS3.

Since the cutting surface CS4 is present, the sectional area of a fourth cross-section SC4 of the fourth hollow circular cylinder HC4 which is taken perpendicularly to the direction of the acceleration beam axis of the charged particles is smaller than a possible sectional area in a case without the cutting surface CS4.

Here, each of the sectional areas of the first hollow circular cylinder HC1, the second hollow circular cylinder HC2, the third hollow circular cylinder HC3 and the fourth hollow circular cylinder HC4 is inversely proportional to the resonance frequency. That is, the smaller each sectional area is, the higher the resonance frequency is. Conversely, the larger each sectional area is, the lower the resonance frequency is.

In the present embodiment, by providing the cutting surfaces CS1 to CS4, the quadrupole accelerator is intentionally configured to have a higher resonance frequency than the frequency (the target value of the resonance frequency) of radio frequency power supplied to the quadrupole accelerator in an initial state. In other words, in the initial state, the total sectional area of the four cross-sections SC1, SC2, SC3 and SC4 is smaller than the total sectional area corresponding to the target value of the resonance frequency.

As shown in FIGS. 1 to 3, in the acceleration cavity 1, the center outer frame part 11*a* and the first side outer frame part 12*a* are in close contact with each other. The center outer frame part 11*a* and the second side outer frame part 13*a* are in close contact with each other. The center outer frame part 11*a* and the side outer frame portions 12*a* and 13*a* are fastened to each other by bolts 51 and nuts 52.

Next, a method of production of a quadrupole accelerator in the present embodiment will be explained. First, the center member 11, first side member 12, and second side member 13 are formed. These component members are prepared in a member preparation step. The member preparation step includes a step of forming the center member 11, first side member 12, and second side member 13 seamlessly from single members.

In the present embodiment, an aluminum block is mechanically machined so as to form the component members. At the step of forming the component members, it is preferable to machine them out by a high precision. Further, in the process of production, a 3D measuring device etc. is preferably used to confirm the dimensions of the center member and the side members. Further, at the contact surfaces of the center outer frame part and the contact surfaces of the side outer frame parts, to secure electrical contact, the surface roughness is preferably made small. Furthermore, the inside surface of the tubular part and the surfaces of the electrodes are preferably worked to a high precision processing or ground etc. so as to reduce the surface roughness.

In the member preparation step, the center outer frame part 11*a* of the center member 11 is formed with the reference marks 31. Further, the first side outer frame part 12*a* of the first side member 12 is formed with positioning marks 32. The second side outer frame part 13*a* of the second side member 13 is formed with positioning marks 32. At the grooved part 16 which is formed at the center member 11, an O-ring 55 is placed as a vacuum sealing member.

Next, the center member 11, first side member 12, and second side member 13 are fastened together by bolts and nuts in the assembly step. The first side member 12 and the second side member 13 are placed at the both sides of the center member 11. In the present embodiment, the reference marks 31 which are formed at the center outer frame part 11*a* and the positioning marks 32 which are formed at the side outer frame parts 12*a* and 13*a* are aligned by positioning.

After the positioning, the bolts are fastened to join the center outer frame part 11*a* with the first side outer frame part 12*a* and second side outer frame part 13*a*. The center member 11, the first side member 12 and the second side member 13 are thereby fastened to each other. When using bolts etc. as the fastening members, it is preferable to tighten them while controlling the torque. This method enables the contact surfaces of the component members to be brought into contact with uniform pressure. The acceleration cavity can be formed in this way. By connecting a power supply device, vacuum device, etc. to this acceleration cavity, an accelerator can be produced.

The reference marks and positioning marks used for aligning are not limited to straight line shapes. Marks of any shapes can be employed. Further, the reference marks and positioning marks in the present embodiment are formed at the end faces in the direction of the acceleration beam axis among the outer surfaces of the acceleration cavity, but the invention is not limited to this. Reference marks and positioning marks may be formed at any positions of the outer surfaces of the acceleration cavity. For example, at the outer surfaces of the outer frame part of the acceleration cavity, the end faces in the direction vertical to the acceleration beam axis may be formed with the reference marks and positioning marks.

As shown FIG. 1, in the frequency accelerator in the present embodiment, when exciting an electromagnetic field of the TE210 mode or TE211 mode suitable for a quadrupole accelerator, the magnitudes of the potential of the electrodes at any time are equal. The polarities are the same at mutually facing electrodes. The polarities of the potentials of mutually facing electrode in one direction are opposite to the polarities of the potentials of the mutual facing electrodes in a direction perpendicular to that one direction. By using the power supply device to supply radio frequency power, the potentials of the electrodes change along with time corresponding to a sine wave. For example, when, at one point of time, the potentials of the first electrode 21 and the second electrode 22 are the maximum value (positive value with maximum magnitude), the potentials of the third electrode 23 and the fourth electrode 24 become the minimum value (negative value with maximum magnitude). After the elapse of the half period of the resonance frequency, the potentials of the electrodes become the reverse relationship.

As described above, the quadrupole accelerator (the quadrupole accelerator in the initial state) assembled by the above-described method of production is intentionally configured to have a higher resonance frequency than the target value of the resonance frequency (the frequency of radio frequency power supplied to the quadrupole accelerator). As a result, in the initial state where the quadrupole accelerator is assembled, charged particles are not accelerated to have desired energy.

Accordingly, in the present embodiment, a tuning process of making the resonance frequency close to the target value at the last of the process of manufacturing the quadrupole accelerator is executed. Hereinafter, referring to a flowchart of FIG. 8, the resonance frequency tuning process (the final manufacturing step of the quadrupole accelerator) is described in detail.

Figure 8:
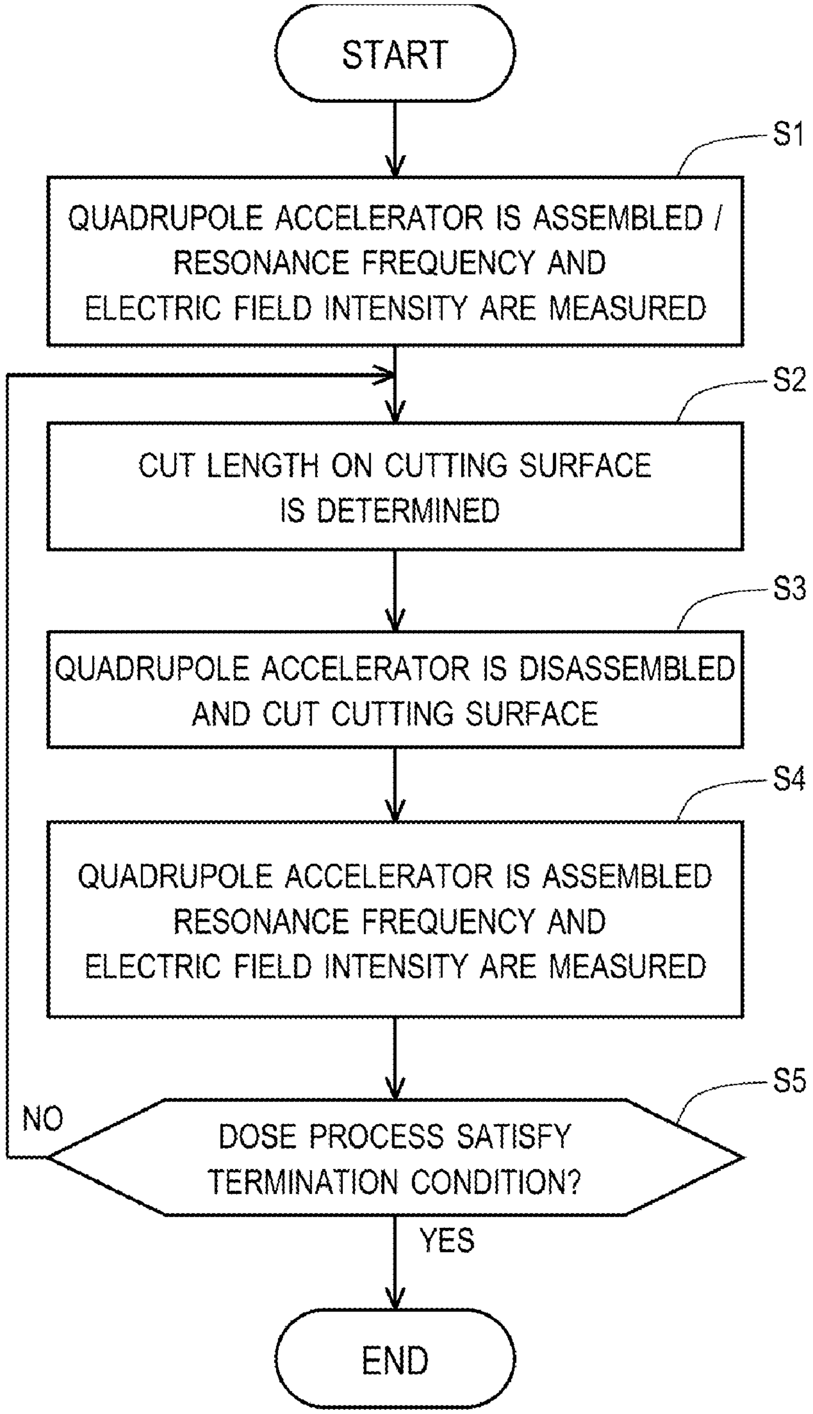
FIG. 8 is a flowchart showing a process of tuning a resonance frequency in a quadrupole accelerator.

First, according to the above-described method of production, the quadrupole accelerator is assembled, and the resonance frequency and the electric field intensity of the quadrupole accelerator in the initial state are measured (step S1 of FIG. 8). Here, the resonance frequency and the electric field intensity are measured by a publicly known measurement instrument, such as a detector (antenna) or a vacuum instrument. Note that the measurement instrument is attached to a side surface of the quadrupole accelerator via a pickup port, not shown.

Specifically, the resonance frequency MF (MHz) is measured as the resonance frequency (Measured Frequency) of the quadrupole accelerator.

As the electric field intensities, electric field intensities ME1, ME2, . . . , ME24 (Measured Electric Field Strength) on 24 surfaces which are the cutting surfaces CS11 to CS16, the cutting surfaces CS21 to CS26, the cutting surfaces CS31 to CS36 and the cutting surfaces CS41 to CS46 are measured. The electric field intensities ME1, ME2, . . . , ME24 are values indicating the relative strengths of electric fields.

Next, the cut lengths on the 24 surfaces, which are the cutting surfaces CS11 to CS16, the cutting surfaces CS21 to CS26, the cutting surfaces CS31 to CS36 and the cutting surfaces CS41 to CS46, are determined based on the measured resonance frequency MF and electric field intensities ME1, ME2, . . . , ME24 on the 24 surfaces (step S2).

Specifically, the following Expressions 1 and 2 are adopted as constraint conditions, and the cut lengths CL1, CL2, . . . , CL24 on the 24 surfaces and the final electric field intensity FE (Final Electric Field Strength) which minimize Φ of the following Expression 3 are calculated.

More specifically, the cut lengths CL1, CL2, . . . , CL24 on the 24 surfaces and the final electric field intensity FE (Final Electric Field Strength) are calculated using the NMinimize function provided by Wolfram Mathematica (R).

The NMinimize function is defined by NMinimize[{f, cons},{x,y, . . . }]. NMinimize[{f,cons},{x,y, . . . }] means numerically minimizing f under the constraint condition cons.

$$TF < MF + \sum_{i=1}^{24} (DF_i \times CL_i) \qquad \text{[Expression 1]}$$

In the Expression 1, TF (target frequency MHz) is a targeted resonance frequency (set to 200.3 MHz in the present embodiment), and is a value set in advance. DFi (Delta Frequency) is a frequency change predicted value (variation) calculated in advance by a simulation. CLi (cut length) is a value calculated by the above-described NMinimize function. The Expression 1 is a constraint condition for preventing the resonance frequency after cutting from falling below the targeted resonance frequency. Note that MF is an actually measured value of the resonance frequency measured in step S1.

$$CL1<MC1 \wedge CL2<MC2 \wedge \ldots \wedge CL24<MC24 \qquad \text{[Expression 2]}$$

In the Expression 2, CL1 to CL24 (cut lengths) are values calculated by the above-described NMinimize function. MC1 to MC24 (maximum cut mm) are the maximum values of cut lengths allowed on the respective cutting surfaces, and are preset values. The Expression 2 functions as a constraint condition for preventing the cut length on each cutting surface from exceeding a cut length allowed on the corresponding cutting surface.

$$\Phi = \sum_{i=1}^{24} \left( FE - \sum_{j=1}^{24} (C_{i\_j} \times CL_j) \right)^2 \qquad \text{[Expression 3]}$$

In Expression 3, $C_{i\_j}$ is a 24×24 coefficients calculated in advance by a simulation. The coefficients are values used to calculate the variation in electric field intensity on the cutting surfaces in accordance with the cut lengths on the corresponding cutting surfaces. The variation in electric field intensity is calculated by $C_{i\_j} \times CL_j$. Accordingly, in the preliminary simulation, $C_{i\_j}$ is calculated by variation in electric field intensity/cut length.

As described above, in the present embodiment, the 24 cutting surfaces which are the cutting surfaces CS11 to CS16, the cutting surfaces CS21 to CS26, the cutting surfaces CS31 to CS36 and the cutting surfaces CS41 to CS46 exist.

For example, when the cutting surface CS11 is cut out, the variation in electric field intensity on each of the total 24 cutting surfaces including the cutting surface CS11 is required to be calculated. For the calculation, there are 24 coefficients $C_{1\_1}$ to $C_{1\_24}$ when the cutting surface CS11 is cut out. Likewise, when the cutting surface CS12 is cut out, the variation in electric field intensity on each of the total 24 cutting surfaces including the cutting surface CS12 is required to be calculated. For the calculation, there are 24 coefficients $C_{2\_1}$ to $C_{2\_24}$ when the cutting surface CS12 is cut out. The same also applies to the remaining cutting surfaces.

As described above, 24×24 coefficients, or $C_{1\_1}$ to $C_{1\_24}$, $C_{2\_1}$ to $C_{2\_24}$, . . . , and $C_{24\_1}$ to $C_{24\_24}$, exist.

By the NMinimize function, the cut lengths CL1, CL2, . . . , CL24 on 24 surfaces and the final electric field intensity FE are calculated, and then the quadrupole accelerator is temporarily disassembled. In accordance with the calculated cut lengths CL1, CL2, . . . , CL24 on the 24 surfaces, the cutting surfaces CS11 to CS16, the cutting surfaces CS21 to CS26, the cutting surfaces CS31 to CS36 and the cutting surfaces CS41 to CS46 are each subjected to a cutting process (step S3 of FIG. 8).

Subsequently, the quadrupole accelerator is reassembled, and the resonance frequency and the electric field intensity of the quadrupole accelerator after the cutting process are measured (step S4).

It is determined whether the electric field distribution based on the measured resonance frequency and the measured electric field intensity respectively satisfy termination conditions (step S5).

Specifically, when the measured resonance frequency falls within 0.3 MHz of a reference value, it is determined that the measured resonance frequency satisfies the termination condition of the frequency. Here, the reference value is the frequency of radio frequency power supplied to the quadrupole accelerator, and is 200 MHz in the present embodiment.

When plotting the electric field distribution based on the electric field intensities on graphs (see FIGS. 9 to 12) indicates that all the electric field distributions of the first hollow circular cylinder HC1, the second hollow circular cylinder HC2, the third hollow circular cylinder HC3 and the fourth hollow circular cylinder HC4 are flat and do not intersect with each other, it is determined that the electric field distribution satisfies the termination condition of the electric field intensity. Note that the flat electric field distribution means that the beam of charged particles is not bent and is accelerated straight.

Figure 9:
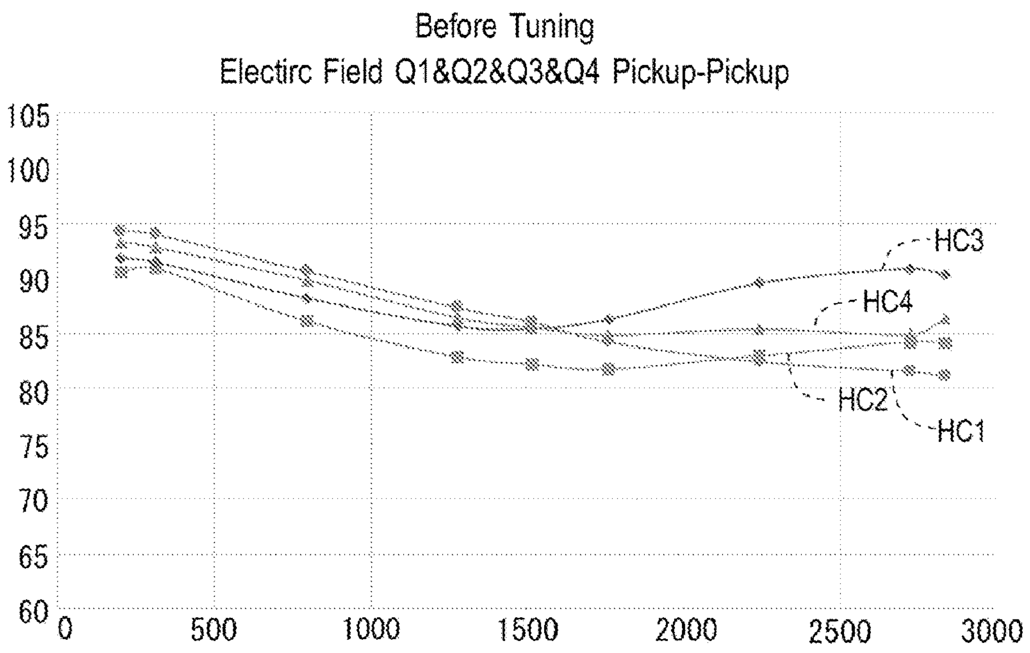
FIG. 9 is a graph plotting an electric field distribution before a process tuning.
Figure 10:
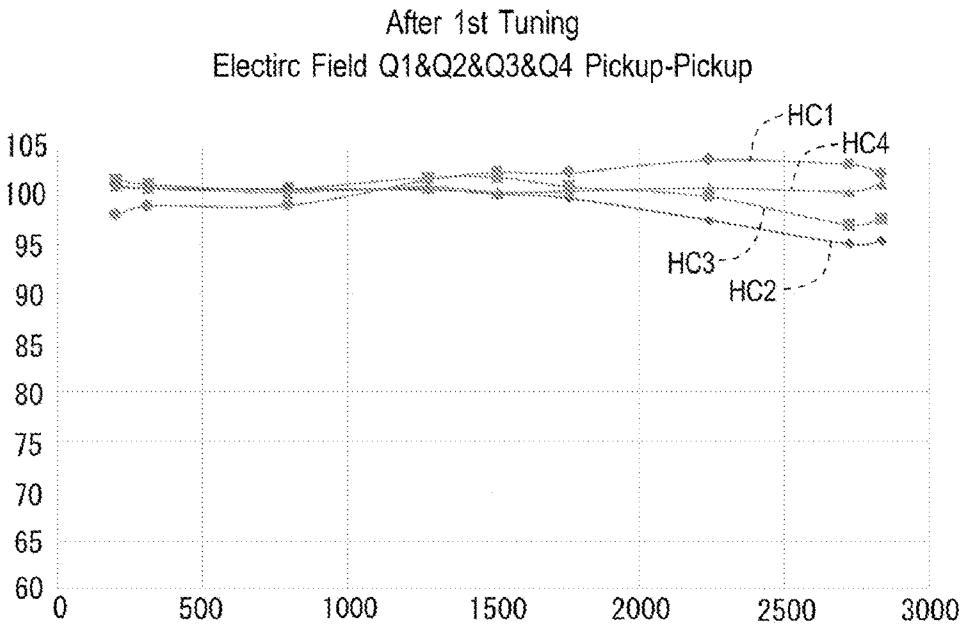
FIG. 10 is a graph plotting an electric field distribution after a first tuning.
Figure 11:
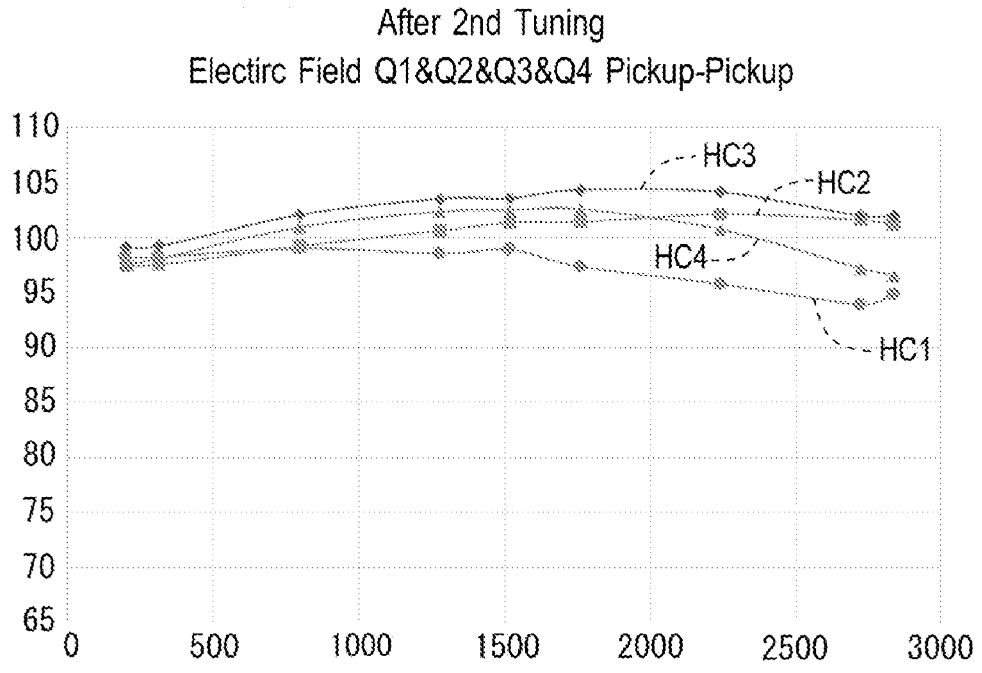
FIG. 11 is a graph plotting an electric field distribution after a second tuning.
Figure 12:
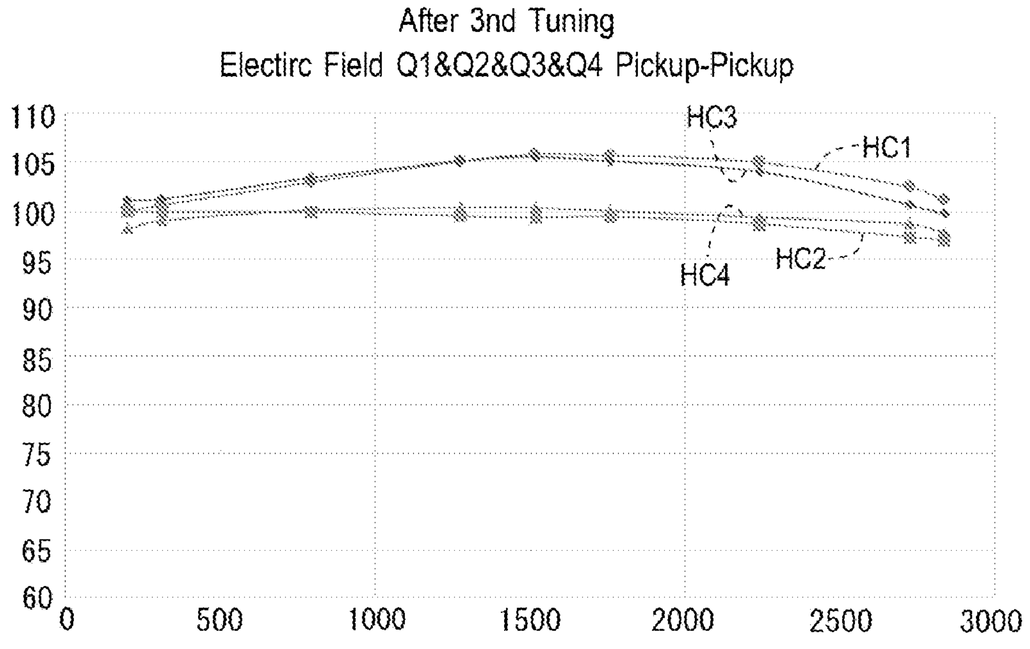
FIG. 12 is a graph plotting an electric field distribution after a third tuning.

FIG. 9 is a graph plotting an electric field distribution before tuning. FIG. 10 is a graph plotting an electric field distribution after first tuning. FIG. 11 is a graph plotting an electric field distribution after second tuning. FIG. 12 is a graph plotting an electric field distribution after third tuning.

The abscissa axis of each graph indicates the distance from the injection port 61 with respect to the direction of the acceleration beam axis of the charged particles. The ordinate axis of each graph indicates the predicted value of electric field intensity when the correct value of electric field intensity is 100%.

FIGS. 9 to 12 show that by repeating tuning, the graphs of electric field distributions gradually become flat for all the first hollow circular cylinder HC1, the second hollow circular cylinder HC2, the third hollow circular cylinder HC3 and the fourth hollow circular cylinder HC4.

The examples in FIGS. 9 to 12 show that at the time of completion of the third tuning, the measured resonance frequency falls within ±0.3 MHz of the reference value, and the electric field distributions of the first hollow circular cylinder HC1, the second hollow circular cylinder HC2, the third hollow circular cylinder HC3 and the fourth hollow circular cylinder HC4 are substantially flat (within ±5% with reference to 100%). However, since some graphs do not fall within ±5% and some graphs have intersections, the termination condition has not been satisfied yet.

When it is determined that in the above-described step S5 both the termination condition of the frequency and the termination condition of electric field intensity are satisfied (YES in step S5), the tuning process is finished.

On the other hand, when it is determined neither the termination condition of the frequency nor the termination condition of the electric field intensity is satisfied, or one of the conditions is not satisfied (NO in step S5), the above-described processes in steps S2 to S5 are repeated until it is determined that both the termination conditions are satisfied.

According to the above-described embodiment, radio frequency current flows through inside surface of the tubular part of the acceleration cavity 1 due to the skin effect. For this reason, the current, as shown by the arrow 104, flows along the surfaces of the electrodes 21 to 24 and the inner surface of the tubular part 2. The surfaces of the electrodes 21 to 24 and the inner surface of the tubular part 2 are free of weld marks and other surface asperity, so the power loss can be reduced. As a result, the quality factor of the accelerator can be raised.

Further, in the present embodiment, the center member and the two side members are formed in advance and these component members are fastened with each other by fastening members. For this reason, in the assembly step, it is possible to avoid a rise in temperature of the component members.

For example, in the assembly step, it is possible to avoid the component members from being heated overall in the case of using brazing for joining them and possible to suppress heat deformation of the component members. Heat deformation includes deformation due to internal stress being released when releasing the fastening of the tubular part by the fastening devices for a temporary assembly. In the present embodiment, it is possible to suppress deformation of the acceleration cavity, so it is possible to suppress deviation of the resonance frequency due to deformation. It is therefore possible to manufacture an accelerator precisely with respect to the design values.

In this way, the quadrupole accelerator in the present embodiment is high in quality factor, small in deviation of the resonance frequency, and otherwise excellent in electrical performance.

Further, the quadrupole accelerator in the present embodiment does not have joints of component parts joined by welding etc., so it is not necessary to perform the mechanical finishing work after welding a plurality of component members and therefore possible to easily manufacture the accelerator. For example, when using electron beam welding to weld component members, the surface roughness was large, so further grinding work and polishing work were necessary. The quadrupole accelerator of the present embodiment enables manufacture of an acceleration cavity with a small surface roughness at the inside surface even without such finishing work.

Further, the quadrupole accelerator in the present embodiment enables confirmation of the state of assembly in the middle of the assembly step. For example, by using a predetermined measuring device, it is possible to find out problems in the middle of the assembly step and correct the work etc. As a result, it is possible to improve the yield. Furthermore, it is possible to easily disassemble the accelerator after assembly in accordance with need by detaching the fastening members. For example, it is possible to readjust the positioning. Alternatively, it is possible to easily change the vacuum sealing members when replacing them.

In the present embodiment, the member preparation step includes a step of forming the reference marks 31 at the end faces of the center member 11 and positioning marks 32 at the end faces of the first side member 12 and the end faces of the second side member 13. The assembly step includes a step for positioning by alignment of the reference marks 31 and the positioning marks 32. By employing this method, the center member 11 and the side members 12 and 13 can be positioned easily.

The method of positioning in the assembly step is not limited to this. Any method may be adopted. For example, a laser tracker can be used for positioning. In this case, for example, at the outer surfaces of the center outer frame part 11*a* and side outer frame parts 12*a*, 13*a*, the outer surfaces which extend in the direction parallel to the acceleration beam axis are formed with a high precision. These outer surfaces can be used as reference surfaces where the reflectors are placed.

Alternatively, it is possible to form in advance engagement parts which have mutually engaging shapes at the center member and side members and mate these engagement parts so as to perform positioning. In the member preparation step, the center member is formed with a first engagement part and the first side member and second side member are formed with second engagement parts. In the assembly step, the first engagement part and the second engagement parts are made to engage with each other, whereby the members can be positioned with each other. This method enables easy positioning.

For example, in the member preparation step, the center member and the side members are made able to be positioned by forming projecting parts as first engagement parts at the center member and forming grooved parts as second engagement parts at the side members. In the assembly step, the projecting parts and grooved parts may be made to engage to easily position the center member and side members.

Alternatively, it is possible to form in advance positioning holes which are communicated when the center member and the side members are positioned right and to insert pins into the positioning holes to enable positioning. In the member preparation step, the center member is formed with first positioning holes, while the first side member and second side member are formed with second positioning holes. In the assembly step, by inserting positioning pins into the first positioning holes and second positioning holes, the members can be positioned with each other. This method enables easy positioned.

For example, in the member preparation step, the center member and side members are formed with positioning holes between the through holes for the bolts used as the fastening members. The positioning holes are formed so that when assembled into the acceleration cavity, the positioning holes of the center member and the positioning holes of the side members are communicated with each other. The positioning holes are preferably formed at a plurality of locations. In the assembly step, pins which can closely fit into the positioning holes are inserted into the positioning holes of the center member and the positioning holes of the side members, whereby the center member and side members can be easily positioned.

In the present embodiment, bolts which pass through the center member, first side member, and second side member are used to fasten these component members, but the invention is not limited to this. Any fastening members can be used to fasten the center member and the side members. For example, the center member may be formed with threaded through holes or blind holes. By inserting bolts from the outsides of the through holes of the first side member, the first side member can be fastened to the center member. Further, by inserting bolts from the outsides of the through holes of the second side member, the second side member can be fastened to the center member. In this way, the side members may be individually fastened to the center member. Due to this method, it is possible to position the members with each other and fasten the members with each other more easily.

In the method of production in the present embodiment, it is possible to easily manufacture a quadrupole accelerator with a long axial direction length along the acceleration beam axis. For example, when using brazing to manufacture a quadrupole accelerator with a long axial direction length, it is necessary to place the acceleration cavity inside a high temperature furnace. For this reason, a large size, high temperature furnace becomes necessary. However, in the present embodiment, the center member and side members are formed seamlessly to enable easy manufacture of an accelerator which is long in the direction of the acceleration beam axis.

Further, in the present embodiment, the member forming the tubular part of the acceleration cavity and the electrodes are formed seamlessly. In the method of production of the acceleration cavity, it may be considered to manufacture the tubular part and the electrodes separately, then use bolts etc. to fasten the electrodes to the tubular part. However, with this method, the number of parts become greater and positioning of the component members with each other becomes difficult. As opposed to this, like in the present embodiment, if employing component members comprised of electrodes and members forming the tubular part formed seamlessly, easy positioning becomes possible. Further, the positional relationship of the tubular part and the electrodes is high in dimensional precision since the precision at the time of machining is maintained. A quadrupole accelerator which is excellent in electrical performance can be provided.

Further, according to the above-described embodiment, the cutting surfaces CS11 to CS16, the cutting surfaces CS21 to CS26, the cutting surfaces CS31 to CS36 and the cutting surfaces CS41 to CS46 are provided. Consequently, in the initial state, the resonance frequency is higher than the frequency of radio frequency power supplied to the quadrupole accelerator. The cutting surfaces CS11 to CS16, the cutting surfaces CS21 to CS26, the cutting surfaces CS31 to CS36 and the cutting surfaces CS41 to CS46 are then gradually cut out, which gradually increases the sectional area of the cross-section SC1 (FIG. 7), the sectional area of the second cross-section SC2 (FIG. 7), the sectional area of the third cross-section SC3 (FIG. 7) and the sectional area of the fourth cross-section SC4 (FIG. 7).

The gradual increase in the sectional area of the cross-section SC1, the sectional area of the second cross-section SC2, the sectional area of the third cross-section SC3 and the sectional area of the fourth cross-section SC4 gradually reduces the resonance frequency in the quadrupole accelerator. That is, the resonance frequency set higher than the target value is made gradually close to the target value. Consequently, without use of the tuner as shown in FIGS. 13 and 14, the resonance frequency in the high-frequency accelerator is adjustable to the desired frequency.

According to the above-described embodiment, the cut length of each of the 24 cutting surfaces is calculated in advance (step S2 of FIG. 8), thereby allowing the cut length for one time to be set to a relatively large value (1 to 4 mm (millimeters)). As a result, the number of cutting times in step S3 of FIG. 8 is reduced, which largely reduces the manufacturing cost.

Further, according to the above-described embodiment, each of the cutting surface CS1, the cutting surface CS2, the cutting surface CS3 and the cutting surface CS4 is divided into six sections. Consequently, the cut length is calculated on a section-by-section basis. The cutting process in the tuning process is executed on the section-by-section basis.

While the disclosure has been described in detail with reference to the above aspects thereof, it would be apparent to those skilled in the art that various changes and modifications may be made therein without departing from the scope of the claims.

The quadrupole accelerator in the present embodiment can interpose conductive members in the region where the center member 11 and the first side member 12 contact and in the region where the center member 11 and the second side member 13 contact. For example, instead of rubber O-rings used as vacuum sealing members, metal sealing members may be placed. Alternatively, in addition to the grooved parts for placement of the vacuum sealing members, it is also possible to additionally form grooved parts at least at one contact surface among the center member and side members and place metal wires or other conductive members at the grooved parts.

By fastening the center member 11 and the side members 12 and 13 through the conductive members, the conduction between the center member 11 and the side members 12 and 13 is improved. Alternatively, the desired electrical performance is ensured.

Further, a quadrupole accelerator rises in temperature due to electrical resistance due to operation. If the temperature greatly rises, the O-rings are liable to damage. In such a case, it is possible to employ metal sealing members so as to avoid damage of the sealing members. For example, metal vacuum sealing members are suitable for a quadrupole accelerator which is continuously operated. Further, a radio frequency accelerator may be provided with a cooling device for cooling the acceleration cavity. For example, cooling tubes for flowing cooling water may be arranged at the insides of the electrodes or at the surfaces of the side members.

The quadrupole accelerator in the present embodiment is formed so that the cross-sectional shape of the tubular part becomes a regular octagon, but the invention is not limited to this. It is possible to employ any shape by which suitable electrical performance as a quadrupole accelerator can be realized. For example, the tubular part can be formed to become a circular or another polygonal cross-sectional shape.

Further, in the present embodiment, the center member and side members are formed from aluminum, but the invention is not limited to this. The center member and side members may be formed from any material. For example, in the member preparation step, the component members may be formed from a block of copper. Alternatively, it is possible to employ component members formed by any materials and then plated with copper on their surfaces.

In the above-described embodiment, the example is described where the cut lengths CL1, CL2, . . . , CL24 on 24 surfaces are calculated by the NMinimize function, and the cutting surfaces are cut out based on the calculated cut lengths CL1, CL2, . . . , CL24, but the invention is not limited to this.

For example, without calculation of the cut length, the resonance frequency may be tuned by setting the cut length for one time to a minute value (0.3 to 0.5 mm (millimeters)) and repeating cutting in conformity with the set minute cut length.

According to the above-described modifications, the cut length for one time is smaller than the cut length (1 to 4 mm (millimeters)) in the above-described embodiment. Consequently, even though the number of cutting times is increased with respect to the above-described embodiment, the cut length is not necessarily calculated in advance.

Further, according to the above-described embodiment, the case is exemplified where each of the cutting surface CS1, the cutting surface CS2, the cutting surface CS3 and the cutting surface CS4 is divided into six sections, and the cut length is calculated on the section-by-section basis, but the invention is not limited to this.

For example, without division of the cutting surface CS1, the cutting surface CS2, the cutting surface CS3 and the cutting surface CS4 into multiple sections, calculation may be performed with the cut length being regarded as a continuous value depending on the distance in the direction of the acceleration beam axis of the charged particles.

Further, according to the above-described embodiment, the case is exemplified where the electric field distributions are determined to satisfy the termination condition of the electric field intensity when all the electric field distributions are flat and do not intersect with each other, but the invention is not limited to this. The electric field distribution may be determined to satisfy the termination condition of the electric field intensity if all the electric field distributions are substantially flat (variation falls within 5%) even though parts of the electric field distribution (e.g., the opposite ends of the graph) intersect with each other. This is because the opposite ends of the graph (the opposite ends of the electric field distribution) tend to be affected by the outside.

Further, according to the above-described embodiment, the case is exemplified where the sectional areas of the cross-section SC1, the cross-section SC2, the cross-section SC3 and the cross-section SC4 shown in FIG. 7 are increased (enlarged) by cutting out the cutting surface CS1, the cutting surface CS2, the cutting surface CS3 and the cutting surface CS4, but the invention is not limited to this. For example, the sectional areas of the cross-section SC1, the cross-section SC2, the cross-section SC3 and the cross-section SC4 may be respectively increased by processing proximal parts of the electrodes 21, 22, 23 and 24 to be thicker than those in a typical case and cutting the thick proximal parts of the electrodes 21, 22, 23 and 24, without providing the cutting surface CS1, the cutting surface CS2, the cutting surface CS3 and the cutting surface CS4. It is a matter of course that the sectional areas may be respectively increased by cutting the cutting surface CS1, the cutting surface CS2, the cutting surface CS3 and the cutting surface CS4 together with the proximal parts of the electrodes 21, 22, 23 and 24.

In each of the above drawings, the same features are used by the same reference signs. The elements described in the above embodiments and modifications may be combined as appropriate.

What is claimed is:

1. A quadrupole accelerator comprising:

a center member, the center member comprising;

a center outer frame part;

a first electrode which sticks out from the center outer frame part toward an inside; and a second electrode which sticks out from the center outer frame part toward the inside;

a first side member which is fixed to the center member, the first side member comprising;

a first side outer frame part;

a first wall part which extends from the first side outer frame part toward an outside; and a third electrode which sticks out from the first wall part toward the inside; and a second side member which is fixed to the center member, the second side member comprising;

a second side outer frame part;

a second wall part which extends from the second side outer frame part toward an outside; and a fourth electrode which sticks out from the second wall part toward the inside, wherein the center member is formed seamlessly, wherein the first side member is formed seamlessly, wherein the second side member is formed seamlessly, wherein the first side outer frame is fixed to a first side of the center outer frame part by a first fixing member, wherein the second side outer frame is fixed to a second side of the center outer frame part by a second fixing member, wherein a first hollow circular cylinder is formed in a first space, the first space being surrounded by the first wall part, the first electrode, and the third electrode, the first hollow circular being long in a direction of an acceleration beam axis, wherein a second hollow circular cylinder is formed in a second space, the second space being surrounded by the first wall part, the third electrode, and the second electrode, the second hollow circular cylinder being long in the direction, wherein a third hollow circular cylinder is formed in a third space, the third space being surrounded by the second wall part, the second electrode, and the fourth electrode, the third hollow circular cylinder being long in the direction, wherein a fourth hollow circular cylinder is formed in a fourth space, the fourth space being surrounded by the second wall part, the fourth electrode, and the first electrode, the fourth hollow circular cylinder being long in the direction, wherein a first cutting surface is provided on a first inner surface of the first wall part, the first inner surface being a portion forming a part of the first follow cylinder, wherein a second cutting surface is provided on a second inner surface of the first wall part, the second inner surface being a portion forming a part of the second follow cylinder, wherein a third cutting surface is provided on a third inner surface of the second wall part, the third inner surface being a portion forming a part of the third follow cylinder, wherein a fourth cutting surface is provided on a fourth inner surface of the second wall part, the fourth inner surface being a portion forming a part of the fourth follow cylinder, wherein resonance frequency before cutting the first cutting surface, the second cutting surface, the third cutting surface, and the fourth cutting surface is higher than a frequency of high frequency power supplied from a power supply.

2. The quadrupole accelerator according to claim 1, wherein the first cutting surface is divided into a plurality of sections in the direction, wherein the second cutting surface is divided into a plurality of sections in the direction, wherein the third cutting surface is divided into a plurality of sections in the direction, wherein the fourth cutting surface is divided into a plurality of sections in the direction.

3. A method for manufacturing the quadrupole accelerator according to claim 1, the method comprising:

a) assembling the quadrupole accelerator by fixing the first side member and the second side member to the center member and measuring the resonance frequency and electric field intensity;

b) determining a first amount of the first cutting surface, a second amount of the second cutting surface, a third amount of the third cutting surface and a fourth amount of the fourth cutting surface based on the resonance frequency and the electric field intensity;

c) disassembling the quadrupole accelerator and cutting the first cutting surface according to the first amount and cutting the second cutting surface according to the second amount and cutting the third cutting surface according to the third amount and cutting the fourth cutting surface according to the fourth amount;

d) reassembling the quadrupole accelerator and measuring the resonance frequency and the electric field intensity;

e) determining whether an electric field distribution satisfies a termination condition, the electric field distribution being based on the resonance frequency measured in d) and the electric field intensity measured in d);

f) when the termination condition is not satisfied in e), steps b) to e) are repeated; and g) when the termination condition is satisfied in e), processes are ended.

* * * * *